United States Patent
Lindoff et al.

(10) Patent No.: US 8,014,311 B2
(45) Date of Patent: Sep. 6, 2011

(54) SIGNAL MEASUREMENTS BASED ON SYNC SIGNALS

(75) Inventors: Bengt Lindoff, Bjärred (SE); Ylva Jading, Stockholm (SE); Walter Müller, Upplands Väsby (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 163 days.

(21) Appl. No.: 12/564,292

(22) Filed: Sep. 22, 2009

(65) Prior Publication Data

US 2010/0309797 A1    Dec. 9, 2010

Related U.S. Application Data

(60) Provisional application No. 61/185,101, filed on Jun. 8, 2009.

(51) Int. Cl.
*H04L 12/26* (2006.01)
(52) U.S. Cl. ...................................................... 370/252
(58) Field of Classification Search .................. 370/241, 370/252, 332; 455/39, 67, 11, 91, 115.1, 455/115.3, 130, 226.1, 226.2, 403, 422.1, 455/423; 375/259, 260
See application file for complete search history.

(56) References Cited

U.S. PATENT DOCUMENTS

| | | | |
|---|---|---|---|
| 7,454,181 B2 * | 11/2008 | Banister et al. | 455/133 |
| 2003/0224733 A1 | 12/2003 | Schwarz et al. | |
| 2006/0285604 A1 * | 12/2006 | Walton et al. | 375/267 |
| 2007/0011555 A1 * | 1/2007 | Kim et al. | 714/749 |
| 2007/0121552 A1 | 5/2007 | Lindoff | |
| 2007/0213055 A1 | 9/2007 | Sundberg et al. | |
| 2007/0297324 A1 | 12/2007 | Lindoff et al. | |
| 2008/0031368 A1 | 2/2008 | Lindoff et al. | |
| 2008/0267303 A1 | 10/2008 | Baldemair et al. | |
| 2010/0015927 A1 * | 1/2010 | Yuda et al. | 455/69 |

FOREIGN PATENT DOCUMENTS

| | | |
|---|---|---|
| EP | 2028783 A2 | 2/2009 |
| WO | 2009/023792 A1 | 2/2009 |
| WO | 2009/057960 A2 | 5/2009 |
| WO | 2009/058091 A2 | 5/2009 |

OTHER PUBLICATIONS

EPO, Intl Search Report in PCT/EP2010/057239, Oct. 1, 2010.
EPO, Written Opinion in PCT/EP2010/057239, Oct. 1, 2010.
Kazmi et al., Evaluation of Inter-Frequency Quality Handover Criteria in E-UTRAN, Proc. Vehicular Tech., Apr. 2009, IEEE.

* cited by examiner

*Primary Examiner* — Chi H Pham
*Assistant Examiner* — Robert Lopata
(74) *Attorney, Agent, or Firm* — Potomac Patent Group PLLC

(57) ABSTRACT

Methods and apparatus for determining a load estimate in a receiver in an orthogonal frequency division multiplex (OFDM) communication system include detecting at least one OFDM symbol of at least one predetermined synchronization signal; determining a signal strength measure based on the detected at least one synchronization symbol; detecting at least one OFDM symbol nearby to the OFDM symbol of the at least one predetermined synchronization signal; determining a total signal power measure based on the detected at least one nearby OFDM symbol; and determining the load estimate based on the signal strength measure and the total signal power measure.

15 Claims, 4 Drawing Sheets

SIGNAL MEASUREMENTS BASED ON SYNC SIGNALS

CROSS-REFERENCE TO RELATED APPLICATION

This application claims the benefit of the filing date of U.S. Provisional Patent Application No. 61/185,101 filed on Jun. 8, 2009, which is incorporated here by reference.

TECHNICAL FIELD

This invention relates to radio communication systems and more particularly to measurement of received signal parameter estimation in such systems.

BACKGROUND

In forthcoming evolutions of cellular radio communication system standards, such as Long Term Evolution (LTE) and High-Speed Packet Access (HSPA), the maximum data rate will surely be higher than in previous systems. Higher data rates typically require larger system channel bandwidths. For an IMT advanced system (i.e., a "fourth generation" (4G) mobile communication system), bandwidths of 100 megahertz (MHz) and larger are being considered.

LTE and HSPA are sometimes called "third generation" communication systems and are currently being standardized by the Third Generation Partnership Project (3GPP). The LTE specifications can be seen as an evolution of the current wideband code division multiple access (WCDMA) specifications. An IMT advanced communication system uses an internet protocol (IP) multimedia subsystem (IMS) of an LTE, HSPA, or other communication system for IMS multimedia telephony (IMT). The 3GPP promulgates the LTE, HSPA, WCDMA, and IMT specifications, and specifications that standardize other kinds of cellular wireless communication systems.

An LTE system uses orthogonal frequency division multiplex (OFDM) as a multiple access technique (called OFDMA) in the downlink (DL) from system nodes to user equipments (UEs). An LTE system has channel bandwidths ranging from about 1 MHz to 20 MHz, and supports data rates up to 100 megabits per second (Mb/s) on the largest-bandwidth channels. One type of physical channel defined for the LTE downlink is the physical downlink shared channel (PDSCH), which conveys information from higher layers in the LTE protocol stack and is mapped to one or more specific transport channels. The PDSCH and other LTE channels are described in 3GPP Technical Specification (TS) 36.211 V8.4.0, Physical Channels and Modulation (Release 8) (September 2008), among other specifications.

In an OFDMA communication system like LTE, the data stream to be transmitted is portioned among a number of narrowband subcarriers that are transmitted in parallel.

In general, a resource block devoted to a particular UE is a particular number of particular subcarriers used for a particular period of time. A resource block is made up of resource elements (REs), each of which is a particular subcarrier used for a smaller period of time. Different groups of subcarriers can be used at different times for different users. Because each subcarrier is narrowband, each subcarrier experiences mainly flat fading, which makes it easier for a UE to demodulate each subcarrier. Like many modern communication systems, DL transmissions in an LTE system are organized into frames of 10 milliseconds (ms) duration, and each frame typically includes twenty successive time slots. OFDMA communication systems are described in the literature, for example, U.S. Patent Application Publication No. US 2008/0031368 A1 by B. Lindoff et al.

FIG. 1 depicts a typical cellular communication system 10. Radio network controllers (RNCs) 12, 14 control various radio network functions, including for example radio access bearer setup, diversity handover, etc. In general, each RNC directs calls to and from a UE, such as a mobile station (MS), mobile phone, or other remote terminal, via appropriate base station(s) (BSs), which communicate with each other through DL (or forward) and uplink (UL, or reverse) channels. In FIG. 1, RNC 12 is shown coupled to BSs 16, 18, 20, and RNC 14 is shown coupled to BSs 22, 24, 26.

Each BS, or enodeB in LTE vocabulary, serves a geographical area that is divided into one or more cell(s). In FIG. 1, BS 26 is shown as having five antenna sectors S1-S5, which can be said to make up the cell of the BS 26, although a sector or other area served by signals from a BS can also be called a cell. In addition, a BS may use more than one antenna to transmit signals to a UE. The BSs are typically coupled to their corresponding RNCs by dedicated telephone lines, optical fiber links, microwave links, etc. The RNCs 12, 14 are connected with external networks such as the public switched telephone network (PSTN), the internet, etc. through one or more core network nodes, such as a mobile switching center (not shown) and/or a packet radio service node (not shown).

It should be understood that the arrangement of functionalities depicted in FIG. 1 can be modified in LTE and other communication systems. For example, the functionality of the RNCs 12, 14 can be moved to the enodeBs 22, 24, 26, and other functionalities can be moved to other nodes in the network. It will also be understood that a base station can use multiple transmit antennas to transmit information into a cell/sector/area, and those different transmit antennas can send respective, different pilot signals.

Mobility is an important functionality in cellular communication systems like an LTE system. Fast and efficient cell searches and received signal measurements are important for a UE to get and stay connected to a suitable cell, which can be called a "serving cell", and to be handed over from one serving cell to another. On a regular basis, a UE measures its received signal strength and signal quality of each detected cell, including the serving cell, to determine whether a handover to a new cell is needed or not. The new cell can be on the same frequency as the serving cell or on a different frequency.

In an LTE system, handover decisions are based on measurements of reference signal received power (RSRP), which can be defined as the average UE-received signal power of reference symbols (RS) transmitted by an enodeB. A UE measures RSRP on its serving cell as well as on neighboring cells that the UE has detected as a result of a cell search procedure, as specified for example in Section 5.2 of 3GPP TS 36.304 V8.4.0, User Equipment (UE) Procedures in Idle Mode (Release 8) (December 2008).

The RS, or pilots, are transmitted from each Node B at known frequencies and time instants, and are used by UEs for synchronization and other purposes besides handover. Such reference signals and symbols are described for example in Sections 6.10 and 6.11 of 3GPP TS 36.211 cited above. RS are transmitted from each of possibly 1, 2, or 4 transmit antennas of an enodeB on particular REs that can be conveniently represented on a frequency-vs.-time plane as depicted in FIG. 2. It will be understood that the arrangement of FIG. 2 is just an example and that other arrangements can be used.

FIG. 2 shows an arrangement of subcarriers in resource blocks in two successive time slots, which can be called a sub-frame, in an LTE system. The frequency range depicted in FIG. 2 includes twenty-seven subcarriers, only nine of which are explicitly indicated. In FIG. 2, the resource blocks, which are indicated by dashed lines, each include twelve subcarriers spaced apart by fifteen kilohertz (kHz), which together occupy 180 kHz in frequency and 0.5 ms in time, or one time slot. FIG. 2 shows each time slot including seven OFDM symbols, or REs, each of which has a short (normal) cyclic prefix, although six OFDM symbols having long (extended) cyclic prefixes can be used instead in a time slot. It will be understood that resource blocks can include various numbers of subcarriers for various periods of time.

RS transmitted by a first transmit (TX) antenna of a Node B are denoted R and by a possible second TX antenna in the node are denoted by S. In FIG. 2, RS are depicted as transmitted on every sixth subcarrier in OFDM symbol 0 and OFDM symbol 4 (because the symbols have short cyclic prefixes) in every slot. Also in FIG. 2, the RSs in symbols 4 are offset by three subcarriers relative to the RS in OFDM symbol 0, the first OFDM symbol in a slot.

Besides reference signals, predetermined synchronization signals are needed during cell search. LTE uses a hierarchical cell search scheme similar to WCDMA, in which synchronization acquisition and cell group identifier are obtained from different synchronization channel (SCH) signals. Thus, a primary synchronization channel (P-SCH) signal and a secondary synchronization channel (S-SCH) signal are defined with a pre-defined structure in Section 6.11 of 3GPP TS 36.211. For example, P-SCH and S-SCH signals can be transmitted on particular subcarriers in particular time slots. In an LTE system, the enodeBs transmit two different synchronization signals: a primary synchronization signal (PSS) and a secondary synchronization signal (SSS). Primary and secondary synchronization signals are described in U.S. Patent Application Publication No. US 2008/0267303 A1 by R. Baldemair et al.

In an LTE system, RSRP is estimated with OFDM symbols that include RSs, and a received signal strength indicator (RSSI) should also be measured with the OFDM symbols that are used for the RSRP measurement. FIG. 2 shows the SSS and PSS as OFDM symbols 5, 6 (assuming operation with the short cyclic prefix and frequency-division duplex (FDD). Current LTE systems have the PSS and SSS symbols transmitted in the middle six resource blocks in sub-frames 0 and 5.

FIG. 2 also indicates by the four vertical arrows on the time axis the OFDM symbols that are used for RSRP and RSSI measurements.

While RSRP indicates received signal strength, reference signal received quality (RSRQ) is an implicit measure of the load on the cell, as seen by the UE, and so RSRQ can be an important measure for the network to use in making good handover decisions. RSRQ can be defined as the ratio of the measured RSRP to the measured RSSI. In general, RSSI is the total received signal power over a predetermined number of resource blocks used for signal quality measurements.

Improving energy efficiency in the base station (network) has recently received attention. To reduce cost for a network operator, it is useful to reduce the power consumption of base stations, especially in low-load conditions. One way to do that is to use discontinuous transmission (DTX) in the enodeBs, which is to say that when a cell has no load or a low load, the enodeB spends some of its time in a low-power "sleep" mode with a certain duty cycle.

Nevertheless, an enodeB cannot "sleep" all of the time because it needs to transmit signals that enable UEs to find it and synchronize themselves to it, as well as signals used for handover measurement purposes. One way to increase the DTX possibilities and at the same time provide good handover performance is to use the synchronization signals also for handover measurements, as described in, for example, U.S. Patent Application Publication No. US 2007/0297324 A1 by B. Lindoff et al. In an LTE system, the reference signals, which are transmitted in at least four OFDM symbols in every resource block as depicted in FIG. 2, are used for handover measurements based on RSRP.

Therefore, there is a need for improved methods and apparatus that use synchronization signals in carrying out received-signal measurements for handover and other purposes.

SUMMARY

In accordance with aspects of this invention, there is provided a method of determining a load estimate in a receiver in an OFDM communication system. The method includes detecting at least one OFDM symbol of at least one predetermined synchronization signal; determining a signal strength measure based on the detected at least one synchronization symbol; detecting at least one OFDM symbol nearby to the OFDM symbol of the at least one predetermined synchronization signal, where communication channel characteristics for a nearby OFDM symbol are substantially the same as communication channel characteristics for the at least one OFDM symbol of the at least one predetermined synchronization signal; determining a total signal power measure based on the detected at least one nearby OFDM symbol; and determining the load estimate based on the signal strength measure and the total signal power measure.

Also in accordance with aspects of this invention, there is provided an apparatus in a receiver for determining a load estimate in an OFDM communication system. The apparatus includes a detector configured to recover at least one OFDM symbol of at least one predetermined synchronization signal and at least one OFDM symbol nearby to the OFDM symbol of the at least one predetermined synchronization signal, where communication channel characteristics for a nearby OFDM symbol are substantially the same as communication channel characteristics for the at least one OFDM symbol of the at least one predetermined synchronization signal; and a signal estimator configured to determine a signal strength measure based on the detected at least one synchronization symbol, to determine a total signal power measure based on the detected at least one nearby OFDM symbol, and to determine the load estimate based on the signal strength measure and the total signal power measure.

Also in accordance with aspects of this invention, there is provided a computer-readable medium having stored instructions that, when executed by a computer, cause the computer to carry out a method of determining a load estimate in a receiver in an OFDM communication system. The method includes detecting at least one OFDM symbol of at least one predetermined synchronization signal; determining a signal strength measure based on the detected at least one synchronization symbol; detecting at least one OFDM symbol nearby to the OFDM symbol of the at least one predetermined synchronization signal, where communication channel characteristics for a nearby OFDM symbol are substantially the same as communication channel characteristics for the at least one OFDM symbol of the at least one predetermined synchronization signal; determining a total signal power measure based on the detected at least one nearby OFDM symbol; and determining the load estimate based on the signal strength measure and the total signal power measure.

BRIEF DESCRIPTION OF THE DRAWINGS

The several features, objects, and advantages of this invention will be understood by reading this description in conjunction with the drawings, in which.

DETAILED DESCRIPTION

This description focuses on an LTE communication system for efficient explanation, but the artisan will understand that the invention in general can be implemented in other communication systems.

The inventors have recognized that if the PSS and SSS were used for handover measurements, an enodeB would not need to transmit RSs in sub-frames where no UE is receiving data, and hence the enodeB's DTX duty cycle and energy efficiency could be increased. In particular, the synchronization signals can be used for RSRQ measurements.

Estimation of signal strength (i.e., RSRP) based on either or both of the PSS and SSS is less complicated than estimation of cell load (i.e., RSRQ) in an LTE or equivalent communication system. LTE supports both FDD and time division duplex (TDD) communication, and synchronized and time-aligned cells are musts for TDD (and optional for FDD). Thus, measuring the RSSI in the same OFDM symbol(s) as the RSRP on the PSS and SSS does not correctly indicate the cell load. More precisely, such an RSSI measurement always indicates a full load for the case of synchronized and time-aligned cells because the PSS and SSS from all cells always collide and always are transmitted. Thus, the actual cell load typically cannot be determined from the PSS or SSS.

As described in more detail below, a UE can estimate a received signal quality and implicitly cell load (i.e., RSRQ) in LTE, and use the estimate for handover purposes. Briefly stated, the signal strength (i.e., RSRP) is estimated using OFDM symbols that include either or both of the PSS and SSS, and the cell load (typically, the RSSI) is estimated using OFDM symbols adjacent to, or at least nearby, those OFDM symbols that include the PSS and SSS. The number of nearby symbols used is preferably large enough to provide a useful dynamic range for the RSRQ, e.g., 10-dB from no-load to full-load.

Figure 1:
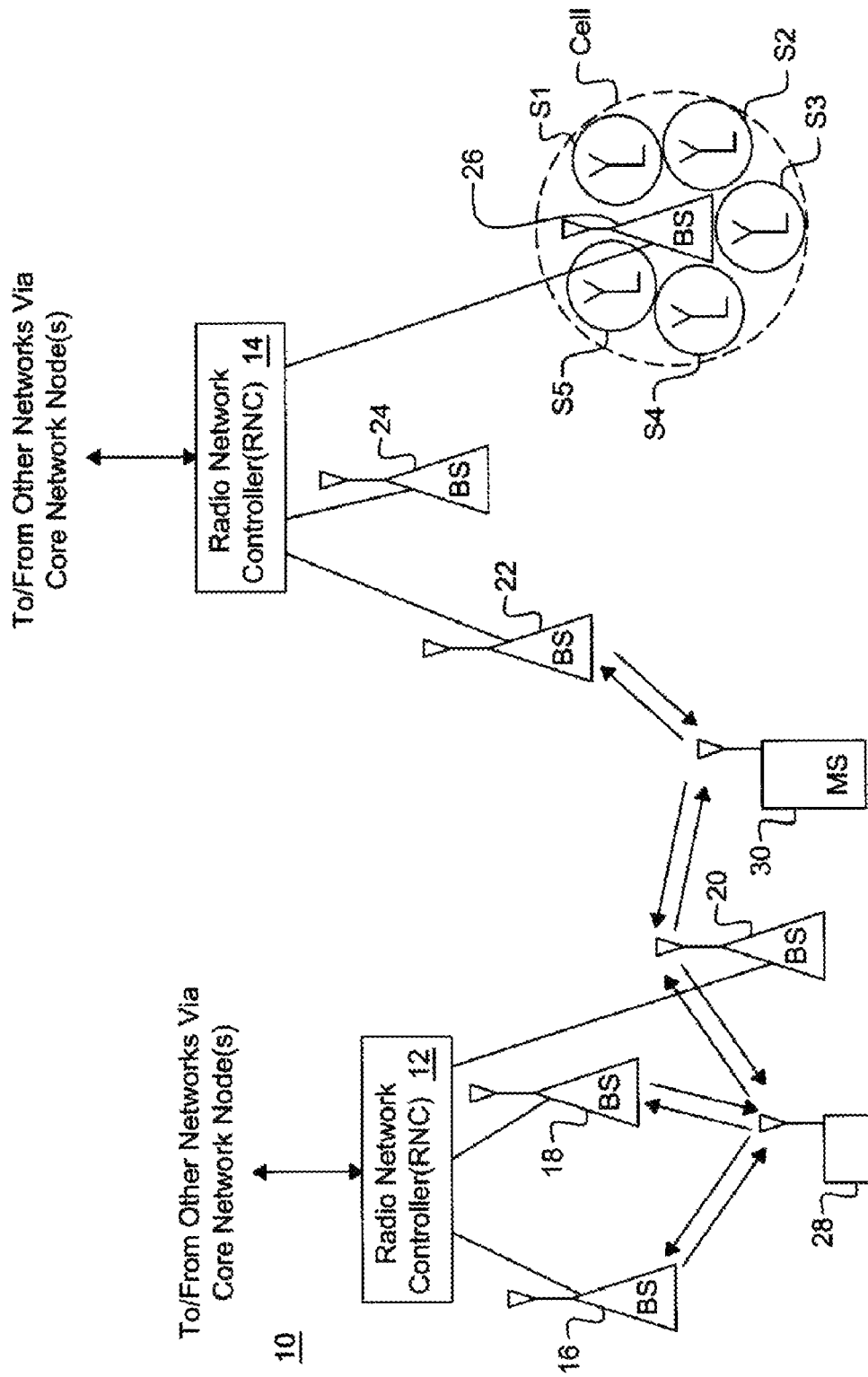
FIG. 1 depicts a cellular communication system.
Figure 2:
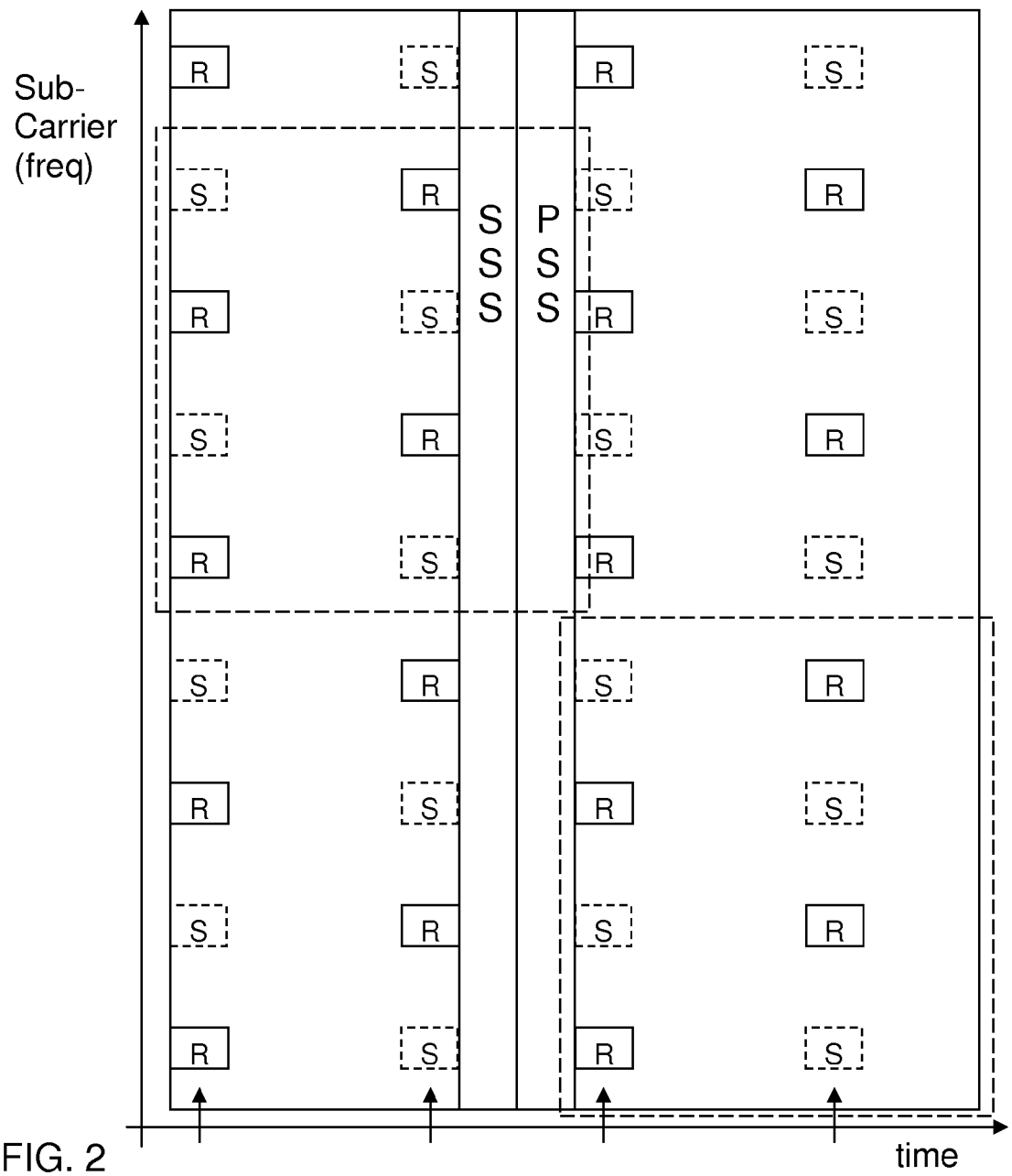
FIG. 2 depicts reference, primary synchronization, and secondary synchronization symbols in a communication system that uses orthogonal frequency division multiple access.
Figure 3:
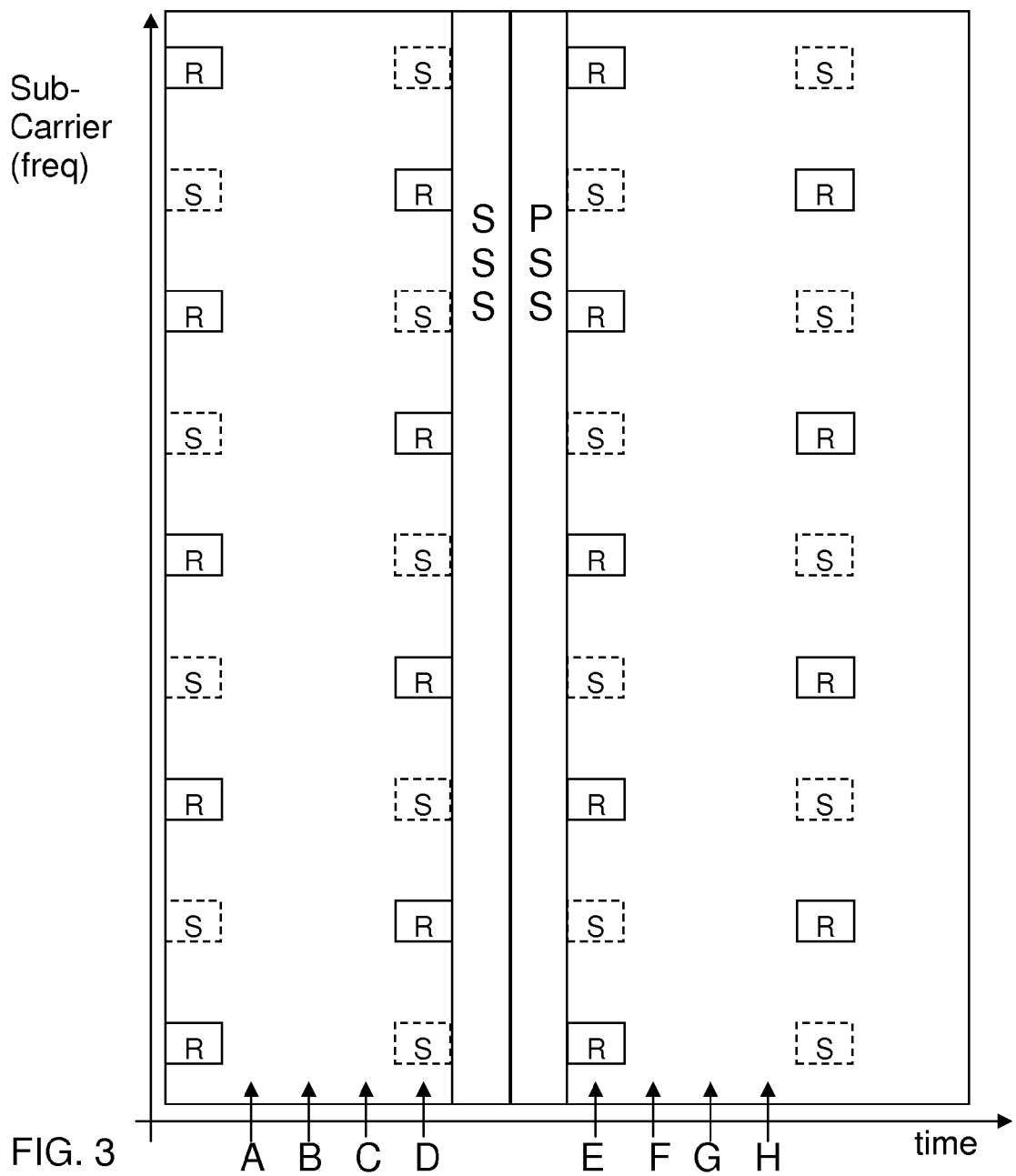
FIG. 3 depicts reference, primary synchronization, and secondary synchronization symbols for improved measurements in a communication system that uses orthogonal frequency division multiple access.

This is depicted by FIG. 3, which like FIG. 2, shows an OFDM sub-frame of two successive time slots with the PSS, SSS, and RSs and a portion of the subcarrier frequency range in an LTE communication system. In accordance with this invention, the OFDM symbols that a UE can use to measure the RSRP are the symbols in either or both of the PSS and SSS, which are known to the UE once the UE has detected the cell. The vertical arrows A-H along the time axis indicate some of the nearby OFDM symbols that a UE can use to measure the RSSI (and RSRQ).

It is currently believed to be preferable for a UE to estimate the RSRP and RSRQ based on symbols that are within a time window of four OFDM symbols, and so in FIG. 3 for example, OFDM symbol pairs (C,D), (D,E), or (E,F) preferably are used for RSSI and RSRQ estimation. It will be noted that in FIG. 3, OFDM symbol 3 is indicated by arrow C, OFDM symbol 4 is indicated by arrow D, OFDM symbol 0 (in the succeeding frame) is indicated by arrow E, and OFDM symbol 2 (in the succeeding frame) is indicated by arrow F. Symbols included in a four-symbol time window can be considered temporally and spectrally "nearby", which is to say that the communication channel characteristics, in particular the channel's impulse response, are substantially the same for the symbols. Even so, other OFDM symbol pairs, e.g., pairs (B,D), (A,D), (C, E), (E, G), or (E, H), can also be "nearby". In a usual implementation, the OFDM symbol adjacent to or a given number (e.g., two, three, etc.) of symbols from the PSS or SSS is used in the estimation. The typical communication system is designed for a predetermined maximum Doppler shift, and "nearby" symbols can be easily determined accordingly.

Figure 4:
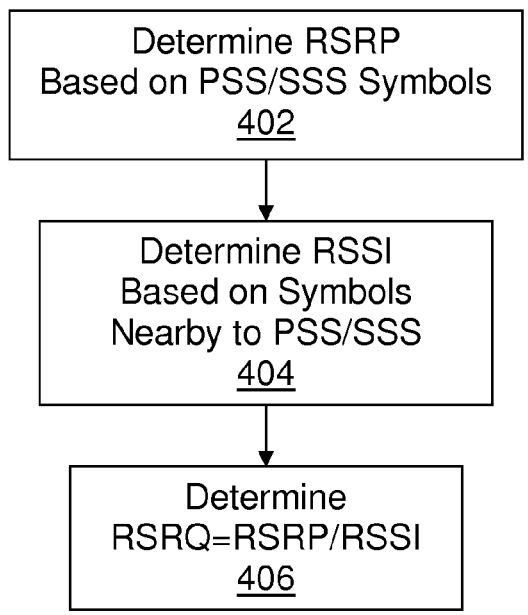
FIG. 4 is a flow chart of a method of generating and informing component carrier cell identity information.

FIG. 4 is a flow chart of a method in a receiver of determining signal measurements, including a load estimate such as RSRQ, in an OFDM communication system that includes predetermined reference and synchronization signals as depicted in FIG. 3. In step 402, the receiver determines a signal strength measure, such as the RSRP, based on one or more symbols of one or more predetermined synchronization signals. This is different from the operation of a conventional receiver, which estimates RSRP based on OFDM symbols that include RSs.

The receiver can carry out the determination in step 402 by detecting a first OFDM symbol that includes a predetermined synchronization signal, such as the PSS or SSS. In an LTE system, for example, a UE can carry out OFDM symbol detection by computing a fast Fourier transform (FFT) of its received signal. The receiver can then determine the RSRP from the detected symbols by coherent and non-coherent averaging of the detected symbols over all PSS/SSS subcarriers (of which there are 62 in total in an LTE system).

Methods of computing the RSRP are known in the art. For example, the UE's baseband signal $Y_i$ corresponding to a PSS symbol $P_i$ from TX antenna 1 can be written as follows:

$$Y_i^1 = H_i^1 P_i + E_i \qquad \text{Eq. 1}$$

from which the impulse response $H_i$ of the communication channel can be estimated using the known PSS symbols $P_i$. Noise $E_i$ is included in Eq. 1. A similar equation can be written for SSS symbols. Coherent averaging of a number M of received synchronization symbols followed by non-coherent averaging of a number N of coherent averages (i.e., non-coherent averaging over N resource blocks) can be written as follows:

$$S^{est} = \frac{1}{N} \sum_{n=1}^{N} \left| \frac{1}{M} \sum_{m=1}^{M} P_m^{est} \right|_n^2 \qquad \text{Eq. 3}$$

in which $S^{est}$ is the RSRP measurement (estimate) and $P^{est}$ are channel response estimates based on the synchronization symbols $P_i$.

In many OFDM communication systems, the number M can typically be around twelve or thirteen, and the number N can typically be around five, which is to say, the averaging is coherent over one subcarrier spanning one resource block and non-coherent over the rest. Recalling that the SSS, for example, typically comprises 62 subcarriers, that can mean that N=5 non-coherent averages of coherent averages of M=13, 12, 12, 12, and 13 sub-carriers are computed. The artisan will understand that other methods of computing the RSRP based on the PSS and/or SSS symbols can be used.

In step 404, the receiver determines a total signal power measure, such as the RSSI or an equivalent estimate of the total received signal power, based on one or more symbols nearby or adjacent to the OFDM symbol(s) on which the RSRP is based, which is to say, not on synchronization-signal symbols. This is different from the operation of a conventional receiver, which estimates the RSSI based on the OFDM symbols that are used for the RSRP measurement.

The receiver can carry out the determination in step 404 by detecting a nearby OFDM symbol by computing an FFT of its received signal. OFDM symbols are "nearby" when the communication channel characteristics, in particular the channel's impulse response, are substantially the same for the symbols. The receiver can then determine the RSSI from the detected non-synchronization-signal symbols in any suitable way. As known in the art, the RSSI can be estimated by computing the variance of the received signal over a given time period.

For example, the UE can compute the RSSI by averaging the squared magnitudes of the symbols' subcarriers spanning a number of resource blocks (e.g., six resource blocks, for a total of 72 subcarriers). The RSSI can be written as follows:

$$RSSI = \sum_{l=1}^{L} |Y_l|^2 \quad \text{Eq. 4}$$

in which $|Y_l|$ is the received signal level of the subcarrier I (of the OFDM symbol used for the RSSI), and L is the total number of subcarriers (of that OFDM symbol). An RSSI value given by Eq. 4 can be scaled to an RSSI per subcarrier by dividing by the number of subcarriers.

In step 406, the receiver determines a cell load measure, such as the RSRQ or an equivalent measure, based on the determined RSRP and RSSI by computing their ratio, which may be scaled by multiplying it by a suitable scale factor, such as the inverse of the total number of subcarriers on which the RSSI is based as noted above. The resulting RSRQ can then be used as desired, e.g., in further processing for handover and other measurements.

It will be appreciated that the method can be carried out after a UE has detected a cell, such as its serving cell, a camping cell, or a neighbor cell, by a conventional cell search procedure, which are well known in the art. It is currently believed to be preferable for a UE to make regular RSRP and RSRQ measurements, e.g., approximately every 40 ms. In addition, a UE can also optionally include information about the RSRP, RSSI, and/or RSRQ in measurement reports that it can send to the network as radio resource control (RRC) messages according to the well known procedures used in HSPA/WCDMA and LTE for such messages. The UE can report RSRP, RSSI, and/or RSRQ for each subcarrier in respective RRC messages or as a an ordered array of measurements of plural subcarriers.

One advantage of using OFDM symbols nearby or adjacent to the PSS/SSS OFDM symbols for measuring the RSSI and RSRQ is that a UE can make the RSRQ and RSRP measurements within a small time window, e.g., a window only four OFDM symbols wide as described above. Thus, the UE can maximize its sleep period if it is configured for discontinuous reception (DRX), and the impact of channel variations between RSRP and RSSI estimation is minimized, and the enodeB can maximize its sleep period if it is configured for DTX.

Figure 5:
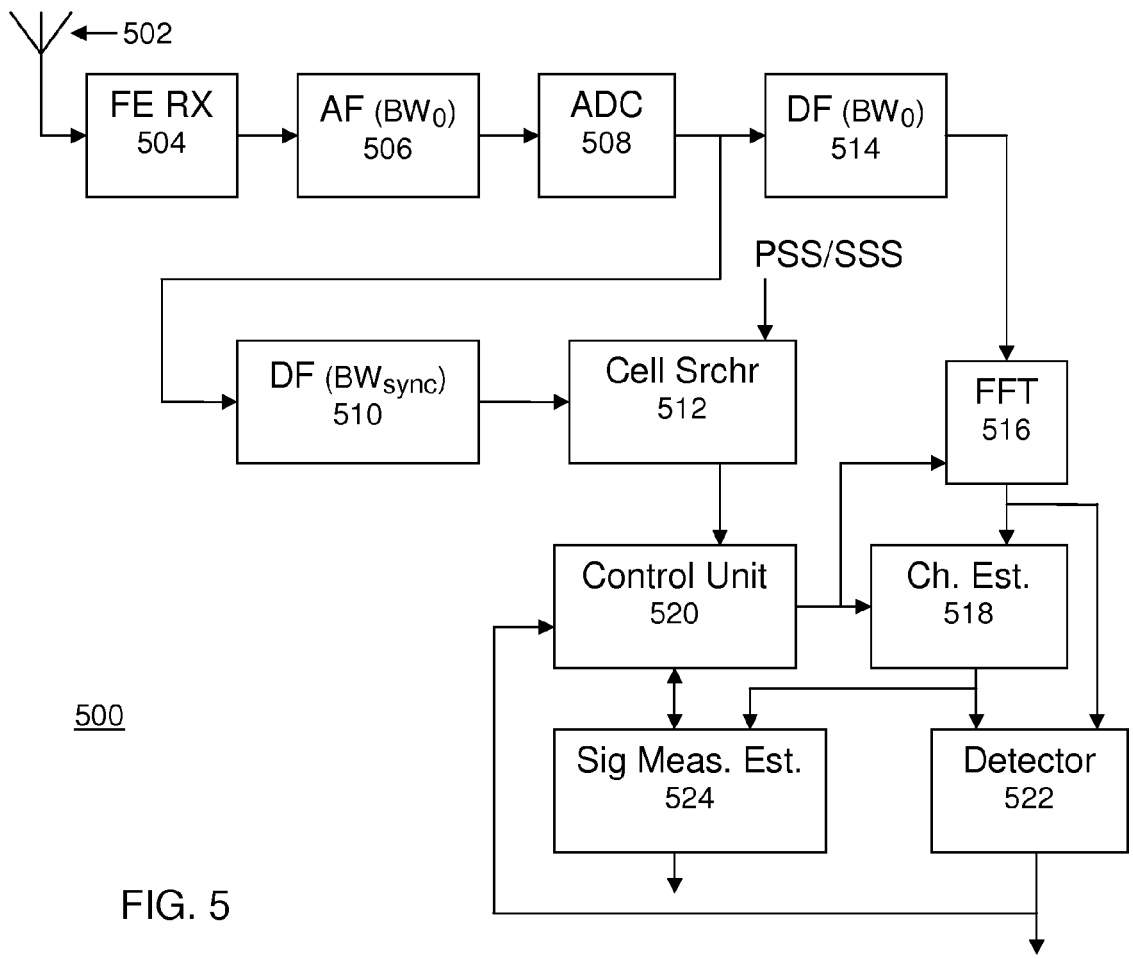
FIG. 5 is a block diagram of a portion of a receiver in a cellular communication system.

FIG. 5 is a block diagram of a portion 500 of a UE that can implement the methods described above. It will be appreciated that the functional blocks depicted in FIG. 5 can be combined and re-arranged in a variety of equivalent ways, and that many of the functions can be performed by one or more suitably programmed digital signal processors or other known electronic circuits.

As depicted in FIG. 5, a UE receives a DL radio signal through an antenna 502 and typically down-converts the received radio signal to an analog baseband signal in a front end receiver (Fe RX) 504. The baseband signal is spectrally shaped by an analog filter 506 that has a bandwidth $BW_0$, and the shaped baseband signal generated by the filter 506 is converted from analog to digital form by an analog-to-digital converter (ADC) 508.

The digitized baseband signal is further spectrally shaped by a digital filter 510 that has a bandwidth $BW_{sync}$, which corresponds to the bandwidth of the synchronization signals (OFDM symbols) included in the DL signal. The shaped signal generated by the filter 510 is provided to a cell search unit 512 that carries out one or more methods of searching for cells as specified for the particular communication system, e.g., LTE. Typically, such methods involve detecting the predetermined PSS and/or SSS in the received signal.

The digitized baseband signal is also provided by the ADC 508 to a digital filter 514 that has the bandwidth $BW_0$, and the filtered digital baseband signal is provided to a processor 516 that implements an FFT or other suitable spectral decomposition algorithm that generates a frequency-domain (spectral) representation of the baseband signal for each cell whose signal measurements (e.g., RSSI, RSRP) will be determined.

The baseband representations of REs corresponding to each cell of interest are provided to a channel estimation unit 518, which generates a channel estimate $H_{i,j}$ for each of several subcarriers i and cells j. For example, the estimator 518 can generate the channel estimates based on control signals provided by a control unit 520 and as described above. Channel estimates can be computed in any of many well known ways, for example as described in U.S. Patent Application Publication No. 2005/0105647 by Wilhelmsson et al. for "Channel Estimation by Adaptive Interpolation".

The estimator 518 provides the channel estimates $H_i$ to a symbol detector 522 and further processing in the UE (not shown), and also to a signal measurement estimation unit 524 that generates received signal measurements (e.g., estimates of RSSI, RSRP, RSRQ, received subcarrier power $S_i$, signal to interference ratio (SIR), etc.). The estimator 524 can generate such estimates as described above and in response to suitable control signals provided by the control unit 520. The measurement estimates generated by the estimator 524 are typically also used in further signal processing in the UE.

In the arrangement depicted in FIG. 5, the control unit 520 keeps track of information needed to configure the processor 516, estimation unit 518, and estimator 524. For the estimation unit 518, this includes information for RS extraction and cell-specific scrambling of RS. Communication between the searcher 512 and the control unit 520 can include cell identity and, for example, cyclic prefix configuration.

It will be appreciated that procedures described above are carried out repetitively as necessary, for example, to respond to the time-varying nature of communication signals exchanged by transmitters and receivers.

To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Wireless transceivers implementing embodiments of this invention can be included in, for example, mobile telephones, pagers, headsets, laptop computers and other mobile terminals, base stations, and the like.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method of determining a load estimate in a receiver in an orthogonal frequency division multiplex (OFDM) communication system, comprising:
    detecting at least one OFDM symbol of at least one predetermined synchronization signal;
    determining a signal strength measure based on the detected at least one synchronization symbol;
    detecting at least one OFDM symbol nearby to the OFDM symbol of the at least one predetermined synchronization signal, wherein communication channel characteristics for a nearby OFDM symbol are substantially the same as communication channel characteristics for the at least one OFDM symbol of the at least one predetermined synchronization signal;
    determining a total signal power measure based on the detected at least one nearby OFDM symbol; and
    determining the load estimate based on the signal strength measure and the total signal power measure.

2. The method of claim 1, wherein the at least one OFDM symbol nearby to the OFDM symbol of the at least one predetermined synchronization signal is temporally adjacent to the OFDM symbol of the at least one predetermined synchronization signal.

3. The method of claim 1, wherein the signal strength measure is a reference signal received power, and the total signal power measure is a received signal strength indicator.

4. The method of claim 1, wherein the load estimate corresponds to a ratio of the signal strength measure and the total signal power measure.

5. The method of claim 1, wherein the at least one predetermined synchronization signal is at least one of a primary synchronization signal and a secondary synchronization signal is a Long Term Evolution communication system.

6. An apparatus in a receiver for determining a load estimate in an orthogonal frequency division multiplex (OFDM) communication system, comprising:
    a detector configured to recover at least one OFDM symbol of at least one predetermined synchronization signal and at least one OFDM symbol nearby to the OFDM symbol of the at least one predetermined synchronization signal, wherein communication channel characteristics for a nearby OFDM symbol are substantially the same as communication channel characteristics for the at least one OFDM symbol of the at least one predetermined synchronization signal; and
    a signal estimator configured to determine a signal strength measure based on the detected at least one synchronization symbol, to determine a total signal power measure based on the detected at least one nearby OFDM symbol, and to determine the load estimate based on the signal strength measure and the total signal power measure.

7. The apparatus of claim 6, wherein the at least one OFDM symbol nearby to the OFDM symbol of the at least one predetermined synchronization signal is temporally adjacent to the OFDM symbol of the at least one predetermined synchronization signal.

8. The apparatus of claim 6, wherein the signal strength measure is a reference signal received power, and the total signal power measure is a received signal strength indicator.

9. The apparatus of claim 6, wherein the load estimate corresponds to a ratio of the signal strength measure and the total signal power measure.

10. The apparatus of claim 6, wherein the at least one predetermined synchronization signal is at least one of a primary synchronization signal and a secondary synchronization signal is a Long Term Evolution communication system.

11. A non-transitory computer-readable medium having stored instructions that, when executed by a computer, cause the computer to carry out a method of determining a load estimate in a receiver in an orthogonal frequency division multiplex (OFDM) communication system, wherein the method comprises:
    detecting at least one OFDM symbol of at least one predetermined synchronization signal;
    determining a signal strength measure based on the detected at least one synchronization symbol;
    detecting at least one OFDM symbol nearby to the OFDM symbol of the at least one predetermined synchronization signal, wherein communication channel characteristics for a nearby OFDM symbol are substantially the same as communication channel characteristics for the at least one OFDM symbol of the at least one predetermined synchronization signal;

determining a total signal power measure based on the detected at least one nearby OFDM symbol; and determining the load estimate based on the signal strength measure and the total signal power measure.

12. The medium of claim 11, wherein the at least one OFDM symbol nearby to the OFDM symbol of the at least one predetermined synchronization signal is temporally adjacent to the OFDM symbol of the at least one predetermined synchronization signal.

13. The medium of claim 11, wherein the signal strength measure is a reference signal received power, and the total signal power measure is a received signal strength indicator.

14. The medium of claim 11, wherein the load estimate corresponds to a ratio of the signal strength measure and the total signal power measure.

15. The medium of claim 11, wherein the at least one predetermined synchronization signal is at least one of a primary synchronization signal and a secondary synchronization signal is a Long Term Evolution communication system.

* * * * *

UNITED STATES PATENT AND TRADEMARK OFFICE
CERTIFICATE OF CORRECTION

| | |
|---|---|
| PATENT NO. | : 8,014,311 B2 |
| APPLICATION NO. | : 12/564292 |
| DATED | : September 6, 2011 |
| INVENTOR(S) | : Lindoff et al. |

Page 1 of 1

It is certified that error appears in the above-identified patent and that said Letters Patent is hereby corrected as shown below:

In the Claims

In Column 12, Line 10, in Claim 15, delete "is a" and insert -- in a --, therefor.

Signed and Sealed this
Eighteenth Day of August, 2015

Michelle K. Lee
*Director of the United States Patent and Trademark Office*